(12) United States Patent
Jirousek et al.

(10) Patent No.: US 7,367,033 B2
(45) Date of Patent: Apr. 29, 2008

(54) DEVICE FOR SCANNING A DISC-SHAPED DATA CARRIER, COMPRISING A TRANSPORT SYSTEM FOR TRANSPORTING THE DATA CARRIER

(75) Inventors: Michael Jirousek, Singapore (SG); Ho Peng Koh, Singapore (SG); Gottfried Hack, Neulengbach (AT); Friedrich Rastelli, Moellersdorf (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 104 days.

(21) Appl. No.: 10/562,883

(22) PCT Filed: Jun. 28, 2004

(86) PCT No.: PCT/IB2004/051028

§ 371 (c)(1),
(2), (4) Date: Dec. 29, 2005

(87) PCT Pub. No.: WO2005/001828

PCT Pub. Date: Jan. 6, 2005

(65) Prior Publication Data

US 2006/0184952 A1    Aug. 17, 2006

(30) Foreign Application Priority Data

Jun. 30, 2003    (EP) .................. 03101944

(51) Int. Cl.
*G11B 1/00* (2006.01)
*G11B 17/04* (2006.01)

(52) U.S. Cl. .................... 720/612; 369/75.21
(58) Field of Classification Search ............ 720/612, 720/607, 600, 632–635, 640, 601; 369/75.11, 369/75.2, 75.21, 77.11, 30.7, 30.72, 30.75
See application file for complete search history.

(56) References Cited

U.S. PATENT DOCUMENTS

| | | | | |
|---|---|---|---|---|
| 4,527,264 A | * | 7/1985 | d'Alayer de Costemore d'Arc | ............... 720/619 |
| 4,607,361 A | * | 8/1986 | Schuitmaker et al. | ....... 720/607 |
| 4,672,598 A | * | 6/1987 | Koken et al. | ............... 720/607 |

(Continued)

OTHER PUBLICATIONS

ISR for Publication, International Publication No. WO2005/001828.

*Primary Examiner*—Brian E. Miller
*Assistant Examiner*—Matthew G. Kayrish
(74) *Attorney, Agent, or Firm*—Michael E. Belk

(57) ABSTRACT

Device for scanning a disc-shaped data carrier, comprising a transport system for transporting the data carrier. In the case of a device (1) for scanning a disc-shaped data carrier (2), with a pivotable data carrier plate (4), which features a receptacle for the data carrier (2), said data carrier (2) is to be able to be moved between the inlay position and the scanning position, which is at a higher level than the inlay position, by means of a combined sliding and swivel action, in order to minimize the design height of the device (1) with an adjustably held transport system (5) for moving the data carrier (2) between an inlay position and a scanning position, in which scanning position the data carrier (2) is located on the data carrier plate (4) for scanning, and with a guide device, such as a lever (9) or sliding blocks (17, 18).

11 Claims, 7 Drawing Sheets

U.S. PATENT DOCUMENTS

| | | | |
|---|---|---|---|
| 4,815,065 A * | 3/1989 | Rouws | 720/603 |
| 4,862,445 A * | 8/1989 | Sasaki | 720/601 |
| 5,067,121 A | 11/1991 | Einhaus | |
| 5,878,013 A * | 3/1999 | Maeda et al. | 720/606 |
| 6,021,104 A * | 2/2000 | Shiomi | 720/607 |
| 6,154,430 A | 11/2000 | Sod | |
| 6,169,720 B1 | 1/2001 | Mori et al. | |
| 6,215,753 B1 * | 4/2001 | Matsumoto | 720/640 |
| 6,683,837 B1 * | 1/2004 | Kayl | 720/612 |

* cited by examiner

DEVICE FOR SCANNING A DISC-SHAPED DATA CARRIER, COMPRISING A TRANSPORT SYSTEM FOR TRANSPORTING THE DATA CARRIER

Device for scanning a disc-shaped data carrier, with a pivotable data carrier plate, which data carrier plate features a receptacle for a data carrier, and with a transport system which is adjustable between a loading position and an operating position for transporting the data carrier between an inlay position and a scanning position, in which scanning position the data carrier is located on the data carrier plate for scanning.

Such devices include conventional drives for compact discs (CDs), irrespective of whether they are data CDs or audio CDs, and irrespective of whether the data carriers are read-only or can also be written to. Furthermore, such devices also include newer DVDs, which are mainly used for the storage of large volumes of data, in particular for storing films.

Conventional CD or DVD drives generally feature, by way of transport system, a loading unit which is designed for the purpose of transporting the data carrier and with the aid of which the data carrier can be brought from an inlay position to a scanning position, in which scanning position the data carrier is located on the data carrier plate (disc plate) for scanning, i.e. for playing back and recording. The data carrier, in its inlay position, then normally lies at a higher level than in its scanning position because the data carrier has to be slid via the data carrier plate and, by lowering the data carrier with the data carrier plate, is then coupled or rests on the data carrier plate. Alternatively, the data carrier plate and a data carrier plate drive unit are raised to the level of the data carrier in its scanning position. However, the equipment-related expense for the last solution mentioned is particularly high. In the method mentioned above, which is applied more frequently, in which the loading unit, following a horizontal sliding movement in the direction of the data carrier plate, is lowered together with the data carrier, the design height of devices with such CD drives is relatively large or high. This is also compounded by the fact that, for optical reasons, an insert opening, through which the loading unit can be moved, is generally provided in one such device in the vertical middle of the device, as a result of which the overall height is increased yet further. Such playback and recording devices for disc-shaped data carriers, in which the loading unit is located in the upper portion of the playback and recording devices, can be designed with a lower design height, although they are unsuitable to be integrated into specially designed devices, such as DVD players with side bevels, as are frequently used at present, as they cannot be installed space-efficiently in the area of the side bevels of the device.

A drive of the type under discussion here is described in patent document U.S. Pat. No. 5,067,121 A, for example. In this drive, a loading unit or transport system conveys the disc-shaped data carrier from an inlay position to a position over the data carrier plate by means of a sliding action. The loading unit is then adjusted by means of a swivel action in such a way that the data carrier is lowered onto the data carrier plate into a scanning position. In this design, the level of the data carrier plate is below that of the inlay position, which means that the data carrier can be moved over the data carrier plate by means of a horizontal sliding action. This solution results in a relatively large design height or an asymmetrical arrangement of the insert opening for the loading unit, which is ultimately undesirable for optical respectively design reasons.

For the sake of completeness, reference is also made to playback devices for disc-shaped data carriers, in particular audio CDs, as are mainly used for CD players in cars, which playback devices are designed without an adjustably held transport system and grip a data carrier with the aid of rubberized rollers and, subsequently, feed it to the data carrier plate with the aid of these rollers. Apart from considerably higher expense in terms of the parts for such playback devices, the rolling action of the rollers is not beneficial to the surface of a data carrier containing the data being played.

It is an object of the present invention to create a device for scanning a disc-shaped data carrier, which device has as low a design height as possible, even if the insert opening for the transport system is located in the vertical middle of the device. Furthermore, a device in accordance with the invention should be able to be used in standard units to drive the data carriers. Furthermore, a device in accordance with the invention should be designed as simply, as robustly and as cost-efficiently as possible.

The object of the present invention, as stated above, is solved by means of a device in accordance with the invention which can be characterized in the following way, namely:

A device for scanning a disc-shaped data carrier, with a pivotable data carrier plate, which data carrier plate features a receptacle for the data carrier, and with a transport system which is held adjustably between a loading position and an operating position for transporting the data carrier between an inlay position and a scanning position, in which scanning position the data carrier is located on the data carrier plate for scanning, and with guide means, which guide means are designed in such a way that the data carrier can be adjusted by a combined sliding and swivel action between the inlay position and the scanning position, which is at a higher level than the inlay position.

The device in accordance with the invention causes the disc-shaped data carrier to be raised, during its displacement between its inlay position and its scanning position, over the data carrier plate, which data carrier plate, in contrast to existing solutions in accordance with the state of the art, is located above the level of the inlay position. This arrangement results in a lower design height which, in turn, permits greater scope in the design of appliances, such as in DVD players and recorders.

In a device in accordance with the invention, it has proved advantageous if the transport system comprises a main element, which main element only executes a sliding action during the displacement between the inlay position and the scanning position, and a tray, which is movably arranged on the main element, to hold the data carrier, which tray executes both a sliding action and a swivel action during the movement of the data carrier between the inlay position and the scanning position, relative to the main element. This design of the transport system for the disc-shaped data carrier comprising two connected parts which move together enables the combined swivel and sliding action of the data carrier to be kept structurally simple, so that the data carrier can be raised over the data carrier plate by simple means during movement between the inlay position and the scanning position and can subsequently be lowered into the scanning position on the data carrier plate.

Advantageously, the main element and the tray are connected via two sliding blocks which slide along the guide elements. This embodiment enables a device in accordance with the invention to be designed with a short structure, which is advantageous in terms of a low installation depth. The structurally short design is rendered possible by virtue of the fact that the main element does not have to be moved the entire distance between the inlay position and the scanning position, but rather displacement of the data carrier between the inlay position and the scanning position takes the form of a two-stage sliding movement, firstly, of the main element and, subsequently, of the tray. In a further feature of the invention, the sliding blocks possess a slot for forming a link guide to hold a portion of a tray or of an element connected to it, causing the insert to be forced into a swivel action during movement of the sliding blocks relative to the main element. One such link guide in the sliding blocks is a simple and effective means of coupling the swivel action to the sliding action. There are, of course, other drive means possible for the transport system.

There are drive means provided on at least one side of the transport system for the purpose of driving or displacing the transport system between its loading position and its operating position. These drive means may be designed in a variety of ways, for example in the form of cable pull means.

Advantageously, there are drive means provided on each side of the transport system for the purpose of driving the transport system. With such a symmetrical formation of drive means, no strain arises during the driving of the transport system between its loading position and its operating position, rendering this type of drive less prone to malfunctions.

The drive means on both sides for the transport system are coupled very advantageously with a shared motor. This saves, first of all, on manufacturing costs as there is only one motor required and, secondly, on space because space does not have to be provided for two electric motors.

The drive means may be designed in a variety of ways whereby a gear drive system and belt drive system are particularly suitable.

One characteristic feature of the invention includes means for detecting a dynamic effect on the transport system in its loading position, which detection means are connected to the drive means for driving the transport system.

The detection means may take the form of appropriate sensors or an appropriate mechanism. The detection means cause the automatically activated transportation of the data medium from the inlay position to the scanning position through a displacement of the transport system from its loading position into its operating position when there is a slight mechanical force exerted upon the transport system from the loading position in the direction of the operating position. This established function is known under the term 'touch to close' and is particularly advantageous in the system in accordance with the invention.

It is also advantageous if there is a pressure device a clamper for pressing the data carrier, which is in its scanning position, onto the data carrier plate, which pressure device is connected to the sliding blocks. As a result, when the sliding blocks are displaced, the pressure device is displaced, which pressure device generally takes the form of a pressure plate and acts upon an element that rotates with the data carrier.

Advantageously, there is a locking element for locking the transport device in its operating position, thereby preventing inadvertent displacement of the transport system during scanning, i.e. during the playing or recording of the data carrier. This locking element can take the form of a mechanically activated lever, preferably in combination with a reset spring, which lever is activated by the movement of the sliding blocks.

It is also advantageous if the transport system is arranged in the vertical middle of the device for scanning a disc-shaped recording carrier. These and other aspects of the invention are apparent from and will be elucidated with reference to the embodiments described hereinafter.

Figure 1A:
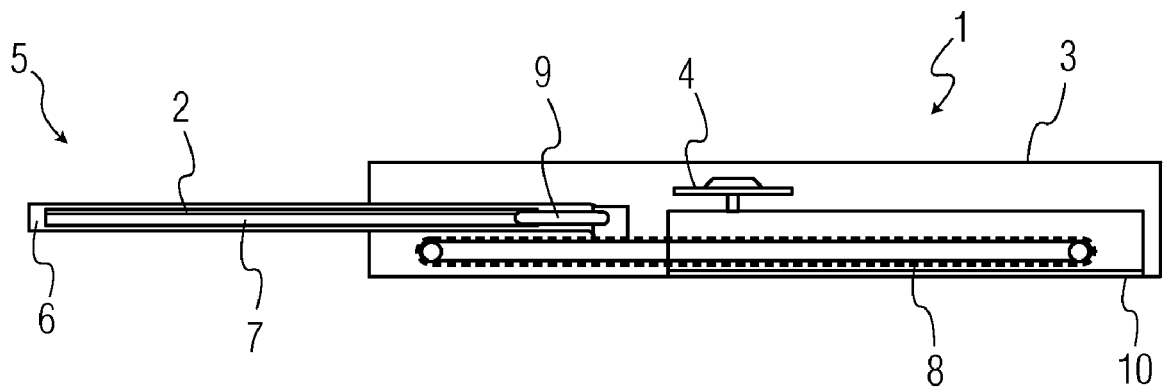
FIGS. 1a to 1i show side section views of a device for scanning a disc-shaped data carrier, which feature a transport system for the data carrier, which transport system is illustrated in FIGS. 1a to 1i in different positions between a loading position in the transport system and an operating position in the transport system.

FIG. 1a shows a device 1 for scanning, i.e. playing and recording, a disc-shaped data carrier 2. The device 1 is contained in a housing 3 and comprises a transport system 5 and a playing unit, from which playing unit there is only a pivotable data carrier plate 4 visible. The data carrier plate 4 can be driven by means of a motor (not shown). The transport system 5 is adjustably held between a loading position and an operating position.

The transport system 5 comprises a main element 6 which only executes a horizontal sliding action during the displacement of the transport system 5. Furthermore, there is an insert 7, for holding the data carrier 2, which insert 7 is movably arranged on the main element 6. The main element 6 can be moved through a loading aperture in the housing 3. In this case the disc-shaped data carrier 2 takes the form of an audio CD. It should be mentioned that data carrier 2 may take the form of other disc-shaped data carriers, such as a CD-ROM or a DVD. By means of the transport system 5, the data carrier 2 can be moved between an inlay position, in which inlay position the data carrier 2 is or can be inserted into the transport system 5 in its loading position, and thus is or can be placed onto the tray 7 of the transport system 7, and a scanning position, in which scanning position the data carrier 2 is located for scanning on the data carrier plate 4 and the transport system 5 is in operating position (see FIG. 1i).

In the device 1, the disc-shaped data carrier 2, in its inlay position shown in FIG. 1a, is at a lower level that the data carrier plate 4. Consequently, when the data carrier 2 is moved between its inlay position and its scanning position, the data carrier 2 must be raised over the data carrier plate 4, as shown in FIGS. 1b to 1i. There is a drive device 8, which may take the form of a belt drive device, for moving the transport system 5 from its loading position to its operating position, and vice versa. The insert 7 is connected to the main element 6 or the drive device 8 via a coupling element 9 to facilitate a combined sliding and swivel action of the insert 7 on the transport system 5. In the embodiment illustrated in FIGS. 1a to 1i, this coupling element 9 is created in the form of a lever-type element. Other embodiments are also possible, which are examined more closely below in FIGS. 2a to 2e. Finally, the data carrier plate 4 and the drive device 8 for driving the transport system 5 are secured to a frame 10, which frame 10 is located inside the housing 3. Starting from the loading position shown in FIG.

Figure 1B:
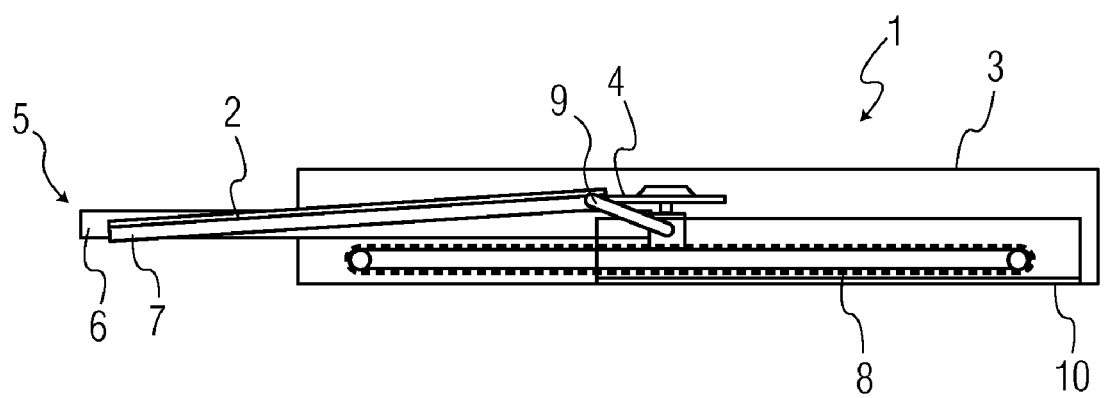
Figure 1C:
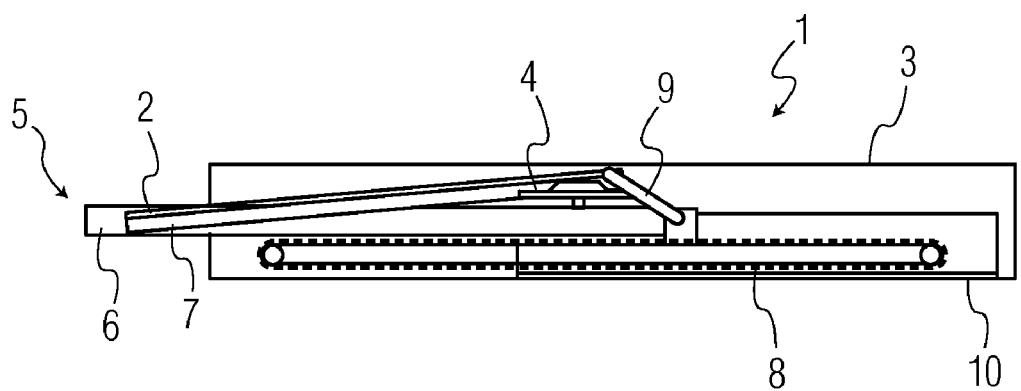
Figure 1D:
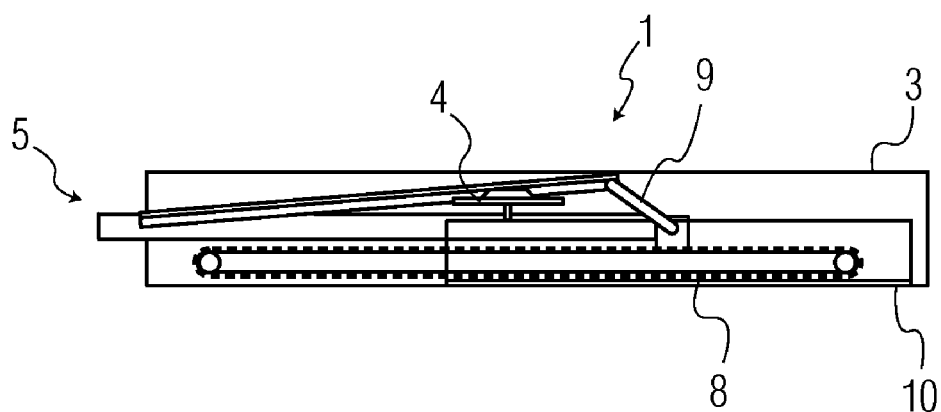
Figure 1E:
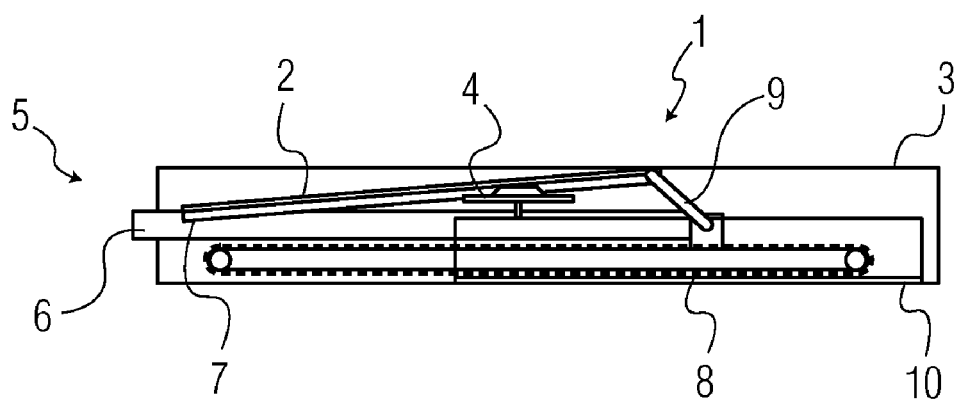
Figure 1F:
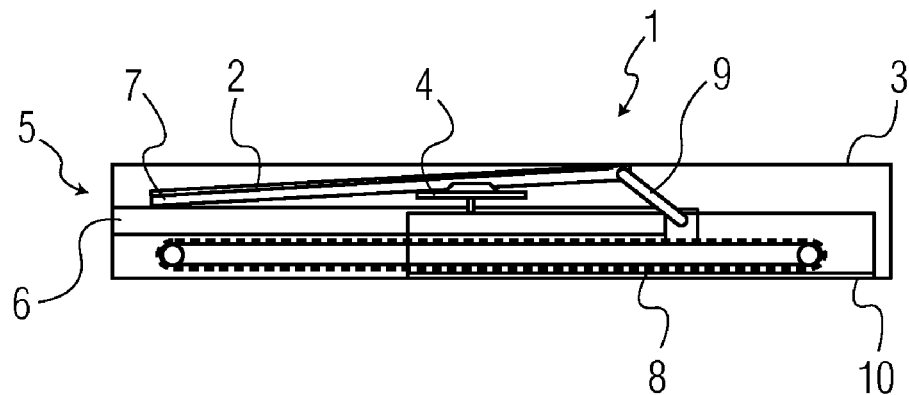
Figure 1G:
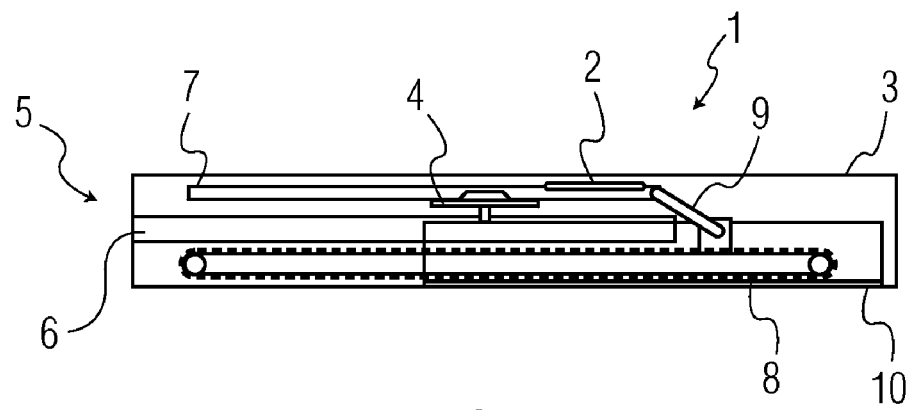
Figure 1H:
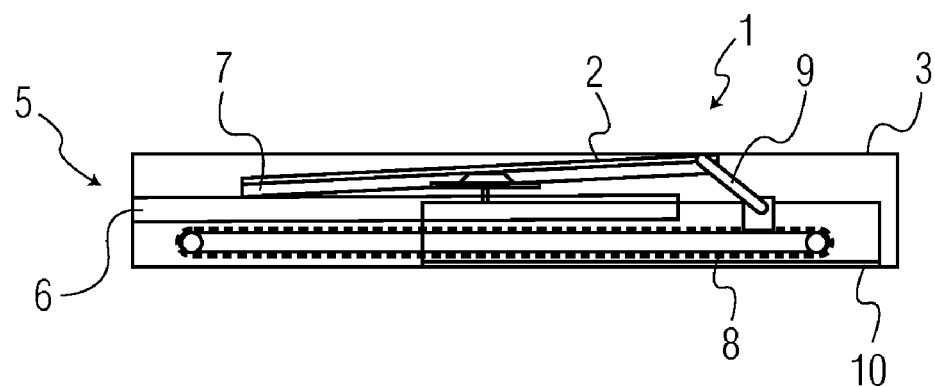
Figure 1I:
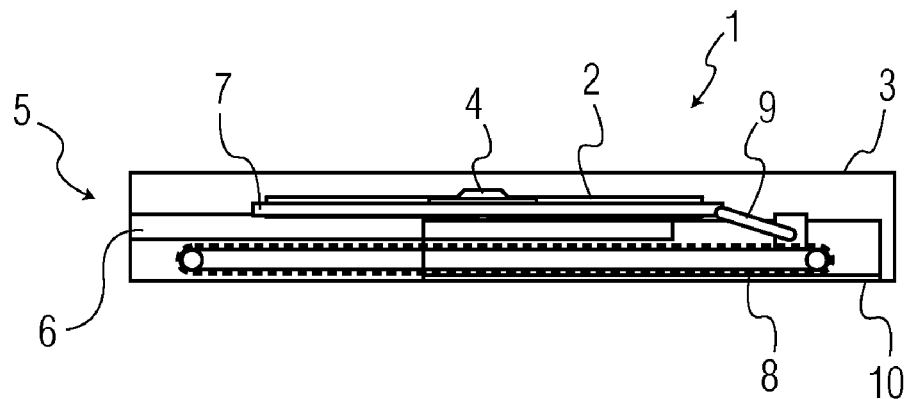

1a, the main element 6 with the insert 7 and the disc-shaped data carrier 2 contained in the insert, is first of all moved horizontally until the data carrier 2 sits just in front of the data carrier plate 4, after which the insert 7 commences a swivel action as shown in FIG. 1b in order to raise the disc-shaped data carrier 2 over the level of the data carrier plate 4, as shown in FIGS. 1c to 1f. In the case of the situation shown in FIG. 1f, the main element 6 of the transport system 5 has reached an end position, in which end position the loading aperture is covered flush by the main element 6. The insert 7, with the disc-shaped data carrier 2 contained in it or on it, is then moved further via the coupling element 9, which coupling element 9, now disengaged from the main element 6 of the transport system 5, performs an horizontal movement as shown in FIGS. 1g to 1i. As soon as insert 7, with the disc-shaped data carrier 2, is positioned over the data carrier plate 4, as shown in FIG. 1h, the insert 7 is swiveled via coupling element 9 towards the data carrier plate 4, in which the insert 7 is moved downwards to the data carrier plate 4, and the disc-shaped data carrier 2 sits on the data carrier plate 4 as shown in FIG. 1i. This position corresponds to the scanning position in which the data carrier 2 sits on the data carrier plate 4 for scanning and is connected torque proof to the data carrier plate 4. The movement of the data carrier 2 back from its scanning position, as shown in FIG. 1i, to its inlay position, as shown in FIG. 1a, takes place in the reverse order, as explained above on the basis of FIGS. 1a to 1i, for movement from the inlay position to the scanning position.

Figure 2A:
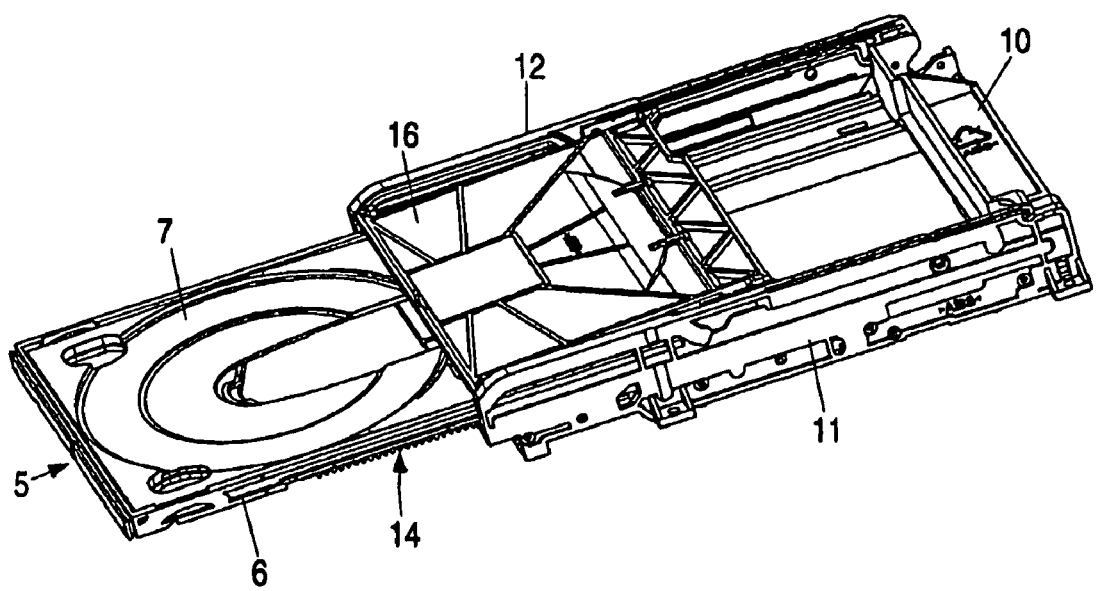
FIGS. 2a to 2e show perspective views of an embodiment of a device for scanning a disc-shaped data carrier, whereby the transport system is illustrated in different positions between the loading position and the operating position.
Figure 2B:
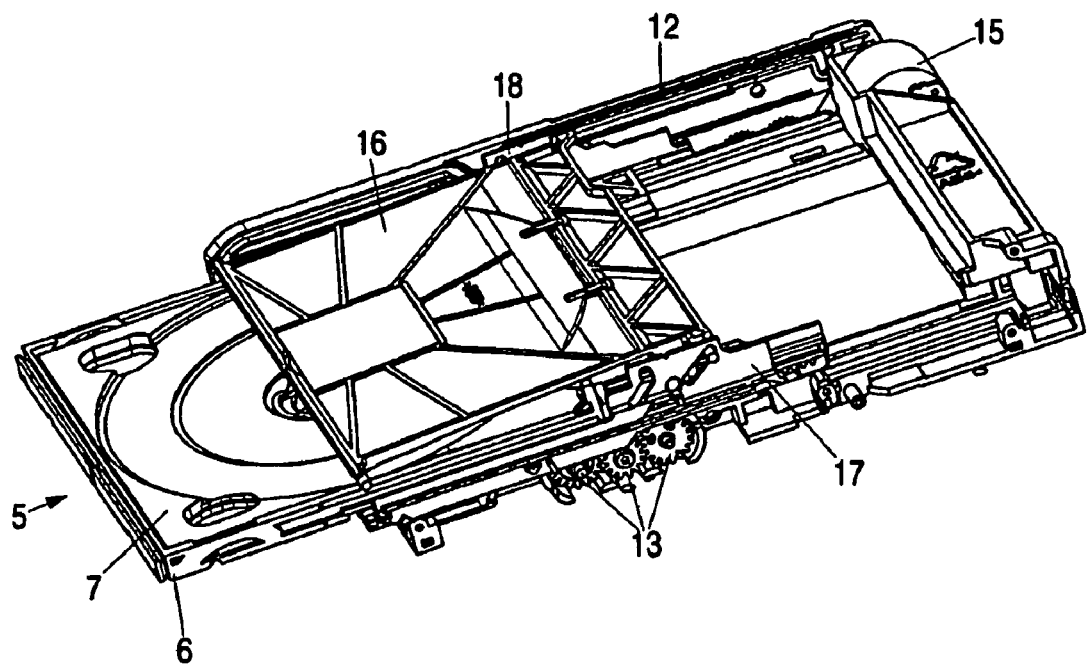
Figure 2C:
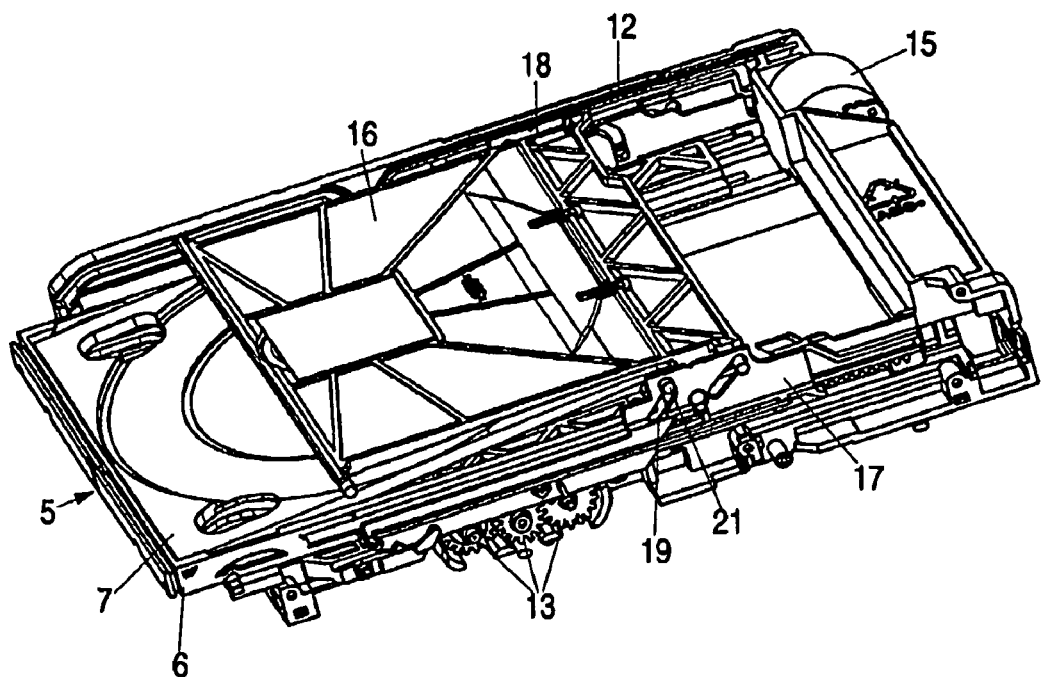
Figure 2D:
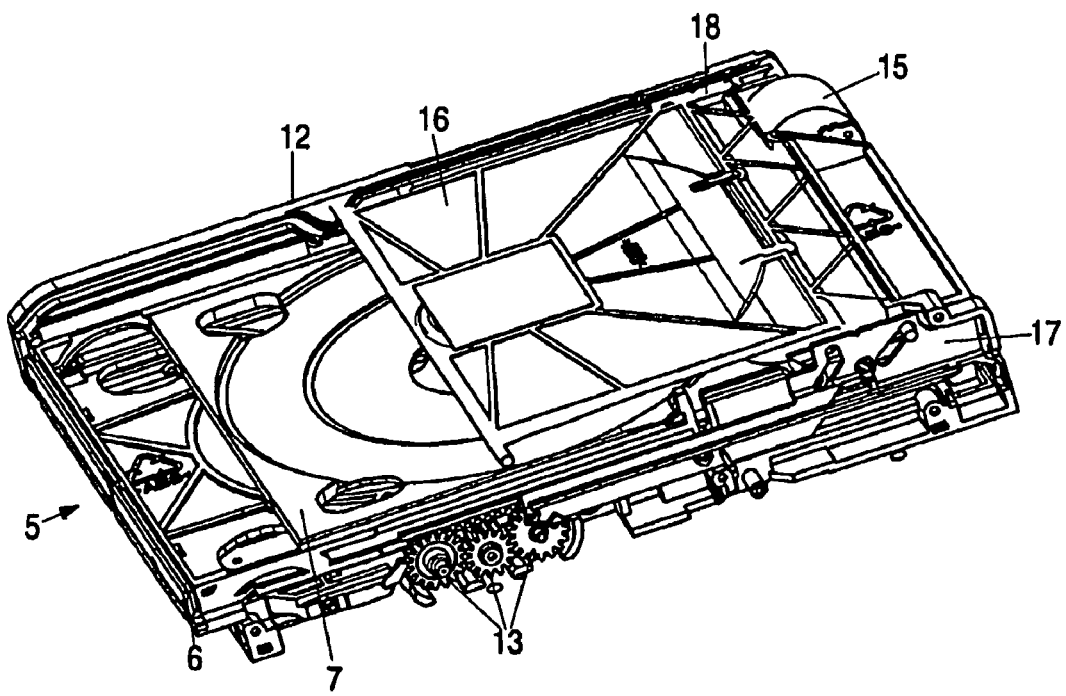
Figure 2E:
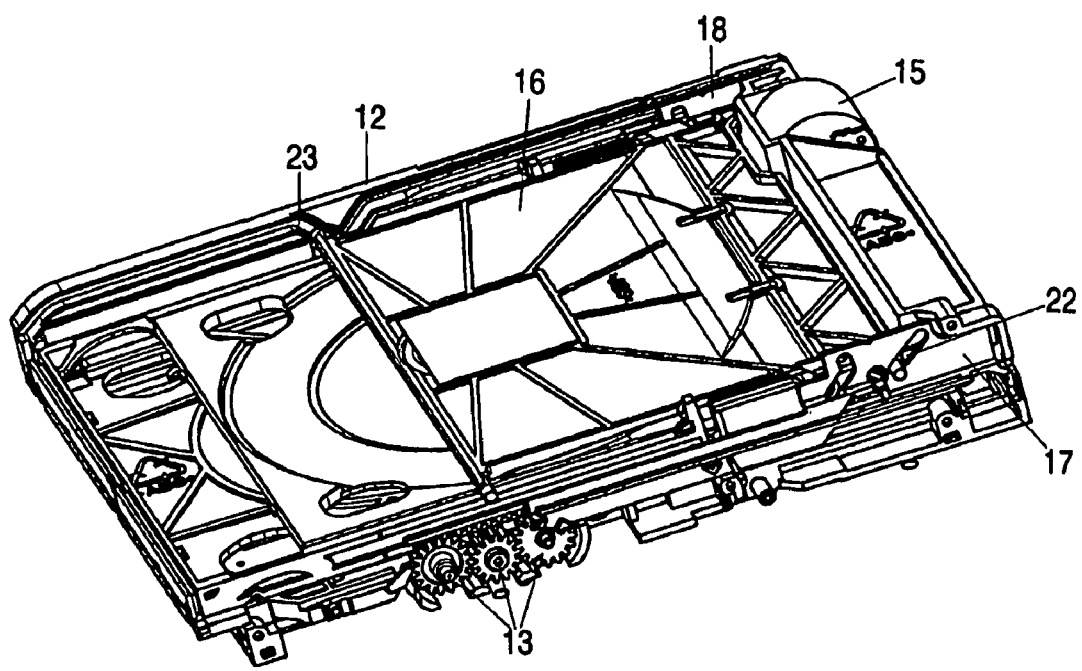

FIGS. 2a to 2e show an embodiment of the device 1 for scanning (playing and recording) a disc-shaped data carrier 2 (not shown here) in a perspective and partly opened representation, in which the transport system 5 adopts different positions between its loading position, as shown in FIG. 2a, and its operating position, as shown in FIG. 2e. The device 1 comprises a frame 10 and the transport system 5, which transport system 5 comprises a main element 6 and an insert 7, which insert 7 is positioned movably on the main element 6, for holding the data carrier 2. The transport system 5 slides along its guide elements 11, 12, in which there is a drive device for driving or displacing the transport system 5, preferably on both sides of the transport system 5, i.e. on either guide element 11, 12. In this case, this drive device is, as shown in FIGS. 2a to 2e, created in the form of a gear drive device with toothed wheels 13 and a rack and pinion 14 on the main element 6 of the transport system 5, whereby the toothed wheels 13 are driven by a shared electric motor 15. Other designs of drive devices which already exist in principle, such as belt drive devices and such like, are also possible, of course. Above the transport system 5 there is a pressure device in the form of a pressure plate 16 (clamper), which pressure plate 16 presses the data carrier 2, which is in its scanning position (see FIG. 2e), onto the data carrier plate 4 (not shown). This pressure plate 16 is located in the loading position as shown in FIG. 2a, raised off the transport system 5, and is lowered on the data carrier 2 (see FIG. 2e), shortly before the disc-shaped data carrier is lowered into its scanning position. In the loading position, as shown in FIG. 2a, the disc-shaped data carrier 2 is placed into the designated recess in the insert 7 of the transport system 5 by hand in the normal way. Thereafter, the motion sequence is started by pressing the designated control element on the device or by pressing the designated control element on a remote control device, provided for this, or by exerting pressure on the transport system 5 in the direction of the frame 10 of device 1, which motion sequence is initiated with a horizontal movement of the transport system 5. This is shown in FIG. 2b, where the right-sided guide element 11 is not shown, thereby rendering the sliding block 17 visible, via which sliding block 17 the main element 6 and the insert 7 on the transport system 5 are connected together. There is another identically structured sliding block 18 positioned on the guide element 12 on the left side of the device 1. As soon as the data carrier 2 stops directly in front of the data carrier plate 4 (not shown), the insert 7 is forcefully swiveled via a slot 19 within the sliding block 17 or via a slot 20 within the sliding block 18, into which slots 19, 20 there is a displacement part, such as a bolt 21 (see FIG. 2c), protruding. In the position shown in FIG. 2c, the main element 6 of the transport system 5 has reached its end position, and the continued movement of the insert 7, containing the disc-shaped data carrier 2, inside the device 1 is brought about by the sliding blocks 17, 18, which sliding blocks 17, 18, now disengaged from the main element 6, perform a horizontal movement. The swivel action of the insert 7, and thus of the disc-shaped data carrier 2, is achieved with the aid of a designated link guide on the insert 7 on the sliding blocks 17, 18 or on the guide elements 11, 12. In the diagram in FIG. 2d, the insert 7 has reached its end position, and the disc-shaped data carrier 2 sits on the data carrier plate 4. Finally, the pressure plate 16 is lowered onto the data carrier 2, as shown in FIG. 2a, which is created by means of the corresponding slots 22, 23 in the sliding blocks 17, 18 and in the guide elements 11, 12. The movement from the operating position, as shown in FIG. 2e, back to the loading position, as shown in FIG. 2a, takes place in the reverse order, as explained above on the basis of the movement from the loading position to the operating position.

Figure 3:
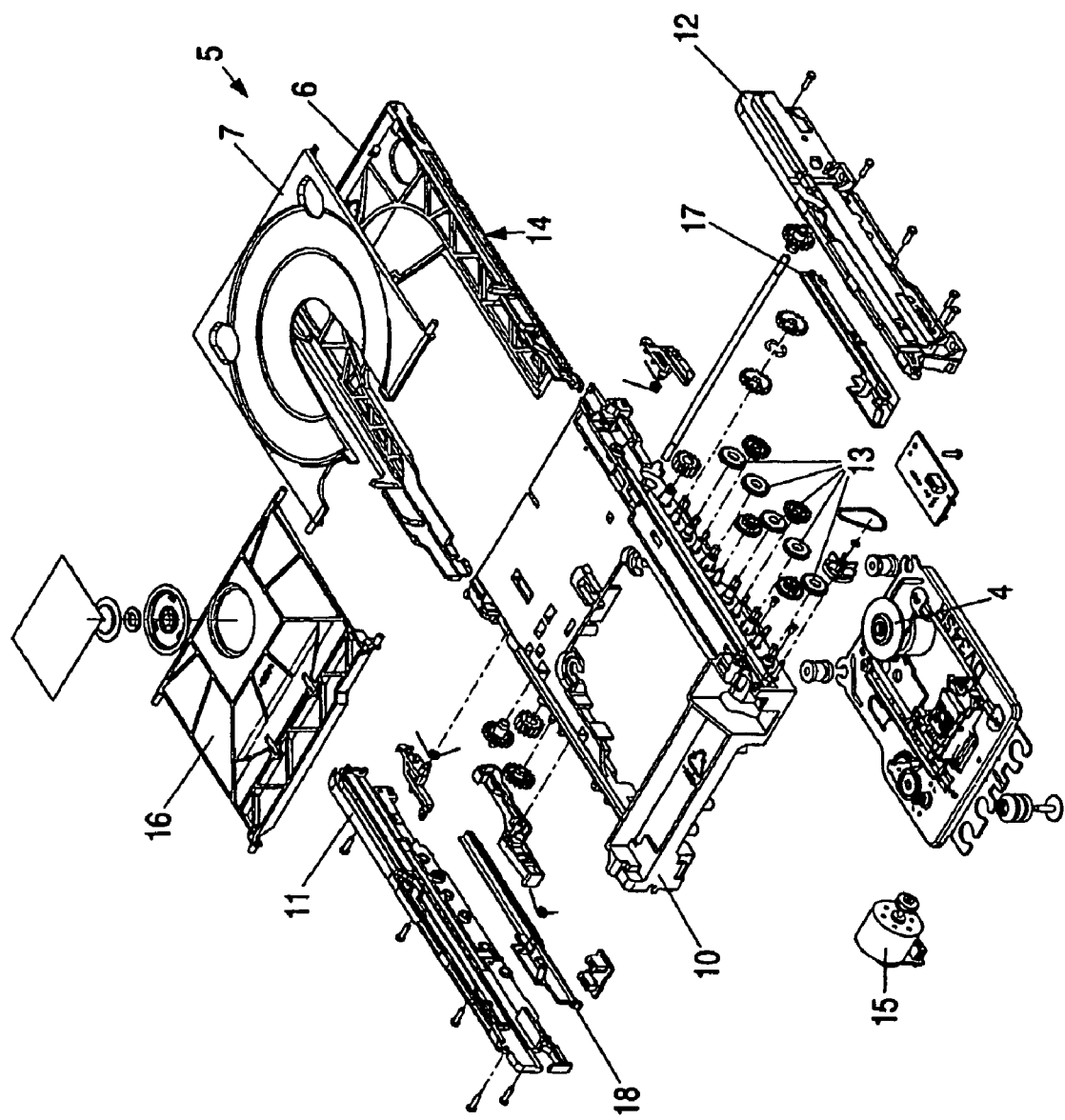
FIG. 3 shows an exploded view of an embodiment of a device for scanning a data carrier in accordance with FIGS. 2a to 2e.

FIG. 3 shows an exploded view of an embodiment of device 1 as shown in FIGS. 2a to 2e, in which only those parts which are of importance to the invention are shown and are described below. According to it, the guide elements 11, 12 are secured to the frame 10. A transport system 5, comprising the main element 6 and the tray 7, slide along the guide elements 11, 12. The connection between the main element 6 and the tray 7 takes place via the guide elements 11, 12 and the sliding blocks 17, 18. The transport system 5 is moved from its loading position to its operating position and back or the disc-shaped data carrier 2 is transported from the inlay position to the scanning position and back with the aid of the drive device, which is created by means of toothed wheels 13 and a rack and pinion 14 on the main element 6 of the transport system 5. This movement or transportation is achieved by means of a shared motor 15. In this solution, the movement of the data carrier 2 also takes place over the data carrier plate 4. In this case the disc-shaped data carrier 2, in its scanning position, is also pressed onto the data carrier plate 4 with the aid of a pressure plate 16.

It should be pointed out that the solutions illustrated in FIGS. 2a to 2e, as well as in FIG. 3, are only embodiments of a device in accordance with the invention. The combined sliding and swivel action of the transport system 5 or of the tray 7 on the transport system 5 can also be achieved with the aid of other mechanisms, e.g. with lever mechanisms or with guide rollers or guide pins which slide along guide slots.

It may be mentioned that the transport system 5 may be designed to hold and transport more than one disc-shaped data carrier, for example three (3) disc-shaped data carriers, whereby the design may be such that only one disc-shaped data carrier can be inserted into the scanning position on the data carrier plate at any one time.

The invention claimed is:

1. A device (1) for scanning a disc-shaped data carrier (2), the device comprising:
    a frame (10),
    a transport system (5) held adjustably between a loading position and an operating position, the transport system (5) comprising a main element (6) and a tray (7) portion, the tray (7) portion being movably arranged on the main element (6) and configured to hold the data carrier (2) and load the data carrier (2) on a pivotable data carrier plate (4) of the device (1) for scanning the data carrier (2),
    guide elements (11, 12) attached to the frame, the guide elements designed for guiding the transport system (5) between the loading position and the operating position, the main element (6) and the tray (7) portion being linked to the guide elements (11, 12) via two sliding blocks (17, 18) which slide along the guide elements (11, 12),
    the device being arranged so that the transport system (5) slides along the guide elements (11,12) such that during a first portion of the movement between the loading position and the operating position the coupled main element (6) and tray portion (7), starting in a vertically neutral position, execute a joint sliding action and during a second portion of the movement, the tray (7) portion executes an upward swivel action relative to the main element (6), while the main element (6) remains stationary
    wherein the operating position of the data carrier (2) is at a higher level than the loading position.

2. A device (1) as claimed in claim 1, in which the sliding blocks (17, 18) possess a slot (19) forming a link guide to hold a portion (21) of the tray (7) causing the tray (7) to be forced into a swivel action relative to the main element (6) during the second portion of the movement between the loading position and the operating position movement of the sliding blocks (17, 18) relative to the main element (6).

3. A device (1) as claimed in claim 1, further comprising drive means (8) provided on at least one side of the transport system (5) for driving the data carrier (2) between the loading position and the operating position.

4. A device (1) as claimed in claim 3, further comprising drive means (8) provided on each side of the transport system (5) for driving the transport system (5).

5. A device (1) as claimed in claim 4, in which the drive means (8) are coupled to either side of the transport system (5) and are driven by a shared motor (15).

6. A device (1) as claimed in claim 3, in which the drive means (8) is a gear drive device.

7. A device (1) as claimed in claim 3, in which the drive means (8) is a belt drive device.

8. A device (1) as claimed in claim 3, further comprising detection means for detecting a dynamic effect on the transport system (5) in the loading position, the detection means being connected to the drive means (8) for driving the transport system (5).

9. A device (1) as claimed in claim 1, further comprising a pressure device (16) for pressing the data carrier (2), in its scanning position, onto the data carrier plate (4), the pressure device (16) being connected to the sliding blocks (17, 18).

10. A device (1) as claimed in claim 1, further comprising locking elements (5) for locking the transport device in the operating position.

11. A device (1) as claimed in claim 1, wherein the transport system (5) is arranged substantially in the middle of the device (1) in a vertical plane.

* * * * *